United States Patent
Lei et al.

(10) Patent No.: US 12,375,209 B2
(45) Date of Patent: Jul. 29, 2025

(54) METHOD AND APPARATUS FOR UPLINK TRANSMISSION ON CONFIGURED GRANT RESOURCES

(71) Applicant: Lenovo (Beijing) Ltd., Beijing (CN)

(72) Inventors: Haipeng Lei, Haidian District (CN); Yu Zhang, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 335 days.

(21) Appl. No.: 18/003,981

(22) PCT Filed: Jul. 3, 2020

(86) PCT No.: PCT/CN2020/100195
§ 371 (c)(1),
(2) Date: Dec. 30, 2022

(87) PCT Pub. No.: WO2022/000483
PCT Pub. Date: Jan. 6, 2022

(65) Prior Publication Data
US 2023/0261789 A1    Aug. 17, 2023

(51) Int. Cl.
*H04W 4/00* (2018.01)
*H04L 1/08* (2006.01)
*H04W 74/08* (2009.01)

(52) U.S. Cl.
CPC ............... *H04L 1/08* (2013.01); *H04W 74/08* (2013.01)

(58) Field of Classification Search
CPC ....... H04L 1/08; H04L 1/1835; H04L 1/1874; H04L 1/1887; H04L 1/189; H04W 74/08; H04W 72/23; H04W 74/0833
USPC .................................................. 370/329, 330
See application file for complete search history.

(56) References Cited

U.S. PATENT DOCUMENTS

| 2019/0075589 | A1 | 3/2019 | Jeon et al. |
| 2020/0162208 | A1 | 5/2020 | Moon et al. |
| 2020/0359409 | A1* | 11/2020 | Karaki .............. H04W 72/0446 |
| 2020/0383095 | A1* | 12/2020 | Moon ..................... H04L 5/001 |

(Continued)

FOREIGN PATENT DOCUMENTS

| CN | 110831179 A | 2/2020 |
| CN | 110958085 A | 4/2020 |

OTHER PUBLICATIONS

Ericsson, "Configured grant enhancement", 3GPP TSG-RAN WG1 Meeting #99, R1-1912712, Reno, USA [retrieved Dec. 27, 2022]. Retrieved from the Internet <https://www.3gpp.org/ftp/tsg_ran/WG1_RL1/TSGR1_99/Docs>., Nov. 2019, 7 Pages.

(Continued)

*Primary Examiner* — Chuong T Ho
(74) *Attorney, Agent, or Firm* — FIG. 1 Patents

(57) ABSTRACT

Embodiments of the present disclosure relate to methods and apparatuses. According to some embodiments of the disclosure, a method may include: determining a first redundancy version (RV) pattern from a set of RV patterns for transmitting a number of repetitions of a first transport block (TB) in a first configured grant (CG) period; performing a channel access procedure for a first repetition of the first TB according to the first RV pattern; and transmitting the number of repetitions of the first TB according to the first RV pattern in response to the channel access procedure for the first repetition of the first TB being successful.

20 Claims, 9 Drawing Sheets

(56) References Cited

U.S. PATENT DOCUMENTS

| | | | | |
|---|---|---|---|---|
| 2021/0144743 | A1* | 5/2021 | Rastegardoost | H04W 72/23 |
| 2022/0077963 | A1* | 3/2022 | Salim | H04L 1/1825 |
| 2022/0104259 | A1* | 3/2022 | Li | H04W 74/006 |
| 2022/0377766 | A1* | 11/2022 | Karaki | H04L 1/1864 |
| 2022/0417963 | A1* | 12/2022 | Wang | H04W 72/23 |
| 2023/0039648 | A1* | 2/2023 | Wang | H04L 1/1887 |
| 2023/0114310 | A1* | 4/2023 | Xu | H04L 1/189 |
| | | | | 370/329 |
| 2024/0089953 | A1* | 3/2024 | Takahashi | H04W 72/1268 |

OTHER PUBLICATIONS

PCT/CN2020/100195, "International Preliminary Report on Patentability", PCT Application No. PCT/CN2020/100195, Jan. 12, 2023, 5 pages.

PCT/CN2020/100195, "International Search Report and Written Opinion", PCT Application No. PCT/CN2020/100195, Apr. 1, 2021, 6 pages.

Vivo, "Discussion on the enhancements to configured grants", 3GPP TSG RAN WG1 #99, R1-1912015, Reno, USA [retrieved Dec. 27, 2022]. Retrieved from the Internet <https://www.3gpp.org/ftp/tsg_ran/WG1_RL1/TSGR1_99/Docs>., Nov. 2019, 11 Pages.

* cited by examiner

METHOD AND APPARATUS FOR UPLINK TRANSMISSION ON CONFIGURED GRANT RESOURCES

TECHNICAL FIELD

Embodiments of the present disclosure generally relate to wireless communication technology, and more particularly to uplink transmission on configured grant resources.

BACKGROUND

In a wireless communication system, a user equipment (UE) may operate in both a licensed spectrum and an unlicensed spectrum. For a transmission on an unlicensed spectrum, in order to achieve fair coexistence with other wireless systems, a UE is required to perform a channel access procedure (e.g., a listen-before-talk (LBT) procedure) before transmission on the unlicensed spectrum. In the LBT procedure, the UE performs energy detection on a certain channel. If the detected energy is lower than a predefined threshold, the channel is deemed as empty and available for transmission, and then the LBT procedure is successful. Only when the LBT procedure is successful can the UE start transmission on the channel and occupy the channel a certain channel occupancy time (COT), which is less than a maximum channel occupancy time (MCOT). Otherwise, the UE cannot start the transmission and may continue to perform another LBT procedure until a successful LBT procedure.

There is a need for handling uplink transmission on an unlicensed spectrum when a channel access procedure for the uplink transmission has failed.

SUMMARY

Some embodiments of the present disclosure provide a method. The method may include: determining a first redundancy version (RV) pattern from a set of RV patterns for transmitting a number of repetitions of a first transport block (TB) in a first configured grant (CG) period; performing a channel access procedure for a first repetition of the first TB according to the first RV pattern; and transmitting the number of repetitions of the first TB according to the first RV pattern in response to the channel access procedure for the first repetition of the first TB being successful.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principle of the present disclosure.

Figure 1:
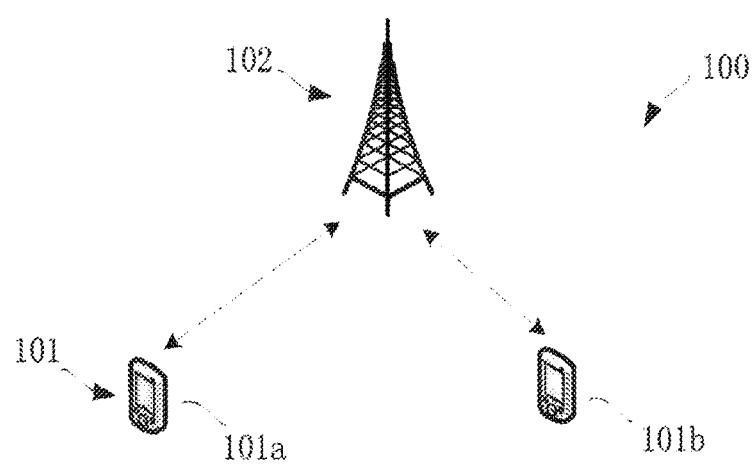
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include some UEs 101 (e.g., UE 101a and UE 101b) and a base station (e.g., BS 102). Although a specific number of UEs 101 and BS 102 are depicted in FIG. 1, it is contemplated that any number of UEs 101 and BSs 102 may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with BSs 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BS 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with the 5G NR of the 3GPP protocol. For example, BS 102 may transmit data using an OFDM modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

In an uplink, configured grant (CG) resources may be configured to a UE by a BS. The UE may use these CG resources to transmit data on a physical uplink shared channel (PUSCH). Two schemes for CG transmission may be supported, mainly differing in the ways they are activated:
  configured grant type 1 (hereinafter, "Type 1"), where an uplink grant is provided by a radio resource control (RRC) signaling, including the activation of the configured grant; and
  configured grant type 2 (hereinafter, "Type 2"), where the uplink transmission periodicity is provided by radio resource control (RRC) signaling and the activation/deactivation as well as necessary information for transmission is provided by layer 1 (L1) control signaling, which functions in a similar way as in the downlink (DL) (e.g., similar to DL semi-persistent scheduling (SPS)).

The benefits for the two schemes are similar, namely to reduce control signaling overhead and, to some extent, to reduce latency as no scheduling request-UL grant cycle is needed prior to data transmission.

Type 1 may set all the transmission parameters, including but not limited to, periodicity, time offset, and frequency resources as well as the modulation and coding scheme (MCS) of possible uplink transmissions, using RRC signaling. Type 2 is similar to DL SPS. For example, RRC signaling may be used to configure the periodicity of possible uplink transmissions, while the activation downlink control information (DCI) may provide other necessary transmission parameters. The UE shall not transmit anything on the configured resources if the higher layers (e.g., RRC layer) did not deliver a transport block (TB) to transmit on the resources allocated for an uplink transmission without a dynamic grant. For both Type 1 and Type 2, a BS can configure multiple UEs with overlapping time-frequency resources in the uplink as long as the BS can differentiate UL transmissions from the multiple UEs.

To provide sufficient reliability, latency, and/or efficiency, both Type 1 and Type 2 may support repetitions for the same TB, and the redundancy version (RV) of each repetition for the same TB may be clarified. An RV may correspond to a start position at a (circular) buffer storing the coded bits, and may be indexed by a number (e.g., 0, 1, 2, or 3). RV value "0" may indicate the RV with the most systematic bits. A repetition with an RV value "n" may be hereinafter referred to as "RVn." For example, RV1 may refer to a repetition of a certain TB having an RV value "1."

In some embodiments of the present disclosure, an RV pattern may be used for an RV indication of repetitions. The repetitions of the same TB may use different redundancy versions by following a specific pattern. An RV pattern may be treated as an order of RVs or a sequence of RV values, which are mapped to consecutive repetitions.

In some examples, the length of an RV value sequence in an RV pattern may be the same as the number of repetitions. For instance, RV pattern {0, 2, 3, 1} may mean that the UE may firstly transmit RV0 of a TB, followed by RV2, RV3, and RV1 of the same TB.

In some other examples, the length of the RV value sequence in an RV pattern may be different from the number of repetitions. In this case, truncation and/or circular duplication may be used to produce the RV values sequence with the same length as the number of repetitions. For instance, when the number of repetitions is indicated as 3, RV pattern {0, 2, 3, 1} may mean that the UE may firstly transmit RV0 of a TB, followed by RV2 and RV3 of the same TB, respectively.

For PUSCH transmissions with a Type 1 configured grant or Type 2 configured grant, the number of repetitions K (also known as "nominal repetitions") to be applied to a transport block may be provided by an indexed row in a time domain resource allocation table when a corresponding parameter (e.g., "numberofrepetitions") is present in the table.

Otherwise, the number of repetitions K may be provided by a higher layer (e.g., RRC) configured parameter, for example, repK. Meanwhile, a set of allowed periodicities P of possible uplink transmissions are defined in 3GPP standard specification (e.g., TS 38.331). Moreover, a higher layer (e.g., RRC) parameter (e.g., "cg-nrofSlots-r16") may provide the number of consecutive slots allocated within a configured grant period. A higher layer (e.g., RRC) parameter (e.g., "cg-nrofPUSCH-InSlot-r16") may provide the number of consecutive PUSCH allocations within a slot, where the time domain location of the first PUSCH allocation (e.g., the first one in the time domain) may be provided by a higher layer parameter (e.g., "timeDomainAllocation"), and the remaining PUSCH allocations may have the same length and PUSCH mapping type as the first PUSCH allocation and may be appended following the previous allocations without any gaps. The same combination of start symbol, length, and PUSCH mapping type may repeat over the consecutively allocated slots.

As mentioned above, in the case that a UE is not provided with the above-mentioned higher layer parameters, the number of repetitions K may be provided in the time domain resource allocation table. Assuming K>1, for both Type 1 and Type 2 PUSCH transmissions with a configured grant, a UE may repeat a TB across K consecutive slots applying the same symbol allocation in each slot.

When a UE is provided with the above-mentioned higher layer parameters, such as "cg-nrofSlots-r16" and "cg-nrof-PUSCH-InSlot-r16," for both Type 1 and Type 2 PUSCH transmissions with a configured grant, the UE may repeat a TB in the repK earliest consecutive transmission occasion candidates within the same configuration. A Type 1 or Type 2 PUSCH transmission with a configured grant in a slot may be omitted according to certain conditions, for example, as specified in 3GPP standard specification TS 38.213.

In some embodiments of the present disclosure, when a UE is configured with repK>1 for configured grant PUSCH transmission, the UE may behave as follows:

"when the UE is configured with repK>1, the repetition of a TB is mapped within a configuration in the case when an UE is configured with multiple active configurations.

The UE may repeat the TB in the earliest consecutive transmission occasion candidates within the same configuration instead of consecutive slots.

The UE may drop repetition transmissions that fall into a subsequent configured period.

The UE may terminate the repetitions if explicit feedback indicating an acknowledgement (ACK) in the downlink feedback information (DFI) is received for the hybrid automatic repeat request (HARQ) process."

Dropping a repetition or a repetition transmission may mean to abandon the repetition or repetition transmission. For example, a UE may clear or flush out the repetition from its buffer or memory, and may not try to transmit the repetition.

However, as mentioned above, a UE is required to perform a channel access procedure (e.g., a listen-before-talk (LBT) procedure) before transmitting on an unlicensed spectrum. In the case that an LBT procedure fails, the UE cannot start transmission on the unlicensed spectrum. Similarly, the prepared configured grant PUSCH transmissions (also referred to "CG-PUSCHs") for repetitions of a TB may not be transmitted due to LBT failure. There is a need for handling the transmission of repetitions on an unlicensed spectrum when a channel access procedure for the transmission of repetitions fails.

For example, in the case that the configured number of repetitions (e.g., repK) is greater than 1 and a given CG configuration includes multiple consecutive transmission occasion candidates, solutions need to be provided for transmitting TB repetitions when one or more TB repetitions cannot be transmitted on the unlicensed spectrum due to LBT failure. More details on the embodiments of the present disclosure will be illustrated in the following text in combination with the appended drawings.

Figure 2:
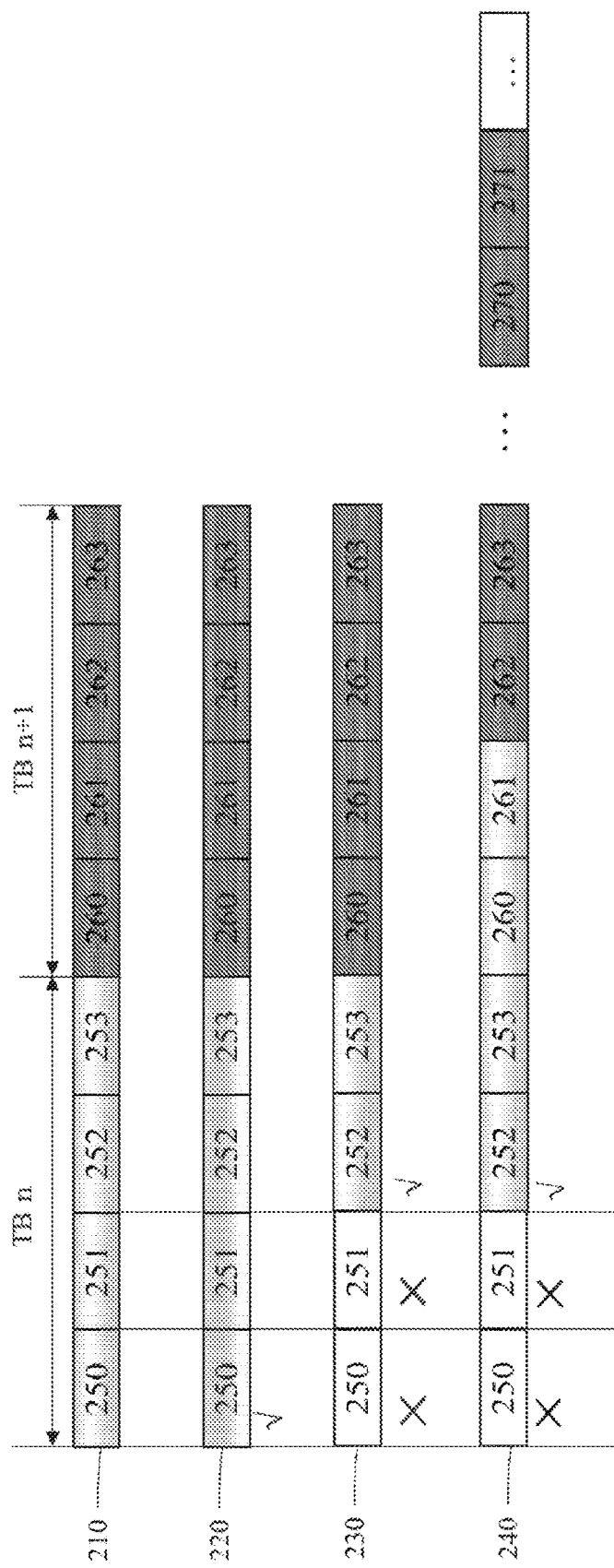
FIG. 2 illustrates an example of an uplink transmission of repetitions of a transport block according an RV pattern in accordance with some embodiments of the present disclosure.

FIG. 2 illustrates an example of an uplink transmission of repetitions of a TB according an RV pattern on an unlicensed spectrum in accordance with some embodiments of the present disclosure. It should be understood that configurations mentioned in the following text are only for illustrative purposes, and should not be construed as limiting the embodiments of the present disclosure. Also, details described in all of the foregoing embodiments of the present disclosure are applicable for the embodiments shown in FIG. 2.

As mentioned above, CG resources may be configured to a UE by, for example, higher layer (RRC) signaling. Assuming that 8 consecutive CG-PUSCHs are configured by a given CG configuration and repK is configured as 4, two TBs may be prepared to be transmitted on the 8 CG resources/occasions within one CG period. For example, in a certain CG period, the first four CG resources may be used to transmit the four repetitions (e.g., repetition 0, repetition 1, repetition 2, and repetition 4) of TB n and the last four CG resources may be used to transmit the four repetitions (e.g., repetition 0, repetition 1, repetition 2, and repetition 4) of TB n+1, wherein n is index of a TB.

In some embodiments of the present disclosure, an RV pattern {0, 2, 3, 1} may be applied to the four repetitions of each TB. In these embodiments, repetitions 0-3 of TB n may be RV0, RV2, RV3, and RV1, respectively. Similarly, repetitions 0-3 of TB n+1 may be RV0, RV2, RV3, and RV1, respectively. In some embodiments of the present disclosure, an RV pattern {0, 3, 0, 3} may be applied to the four repetitions of each TB. In some embodiments of the present disclosure, different RV patterns may be applied to the repetitions of different TBs. For example, RV pattern {0, 2, 3, 1} may be applied to the repetitions of TB n and RV pattern {0, 3, 0, 3} may be applied to the repetitions of TB n+1.

Referring to FIG. 2, at line 210, four CG-PUSCHs (e.g., CG-PUSCHs 250-253) for transmitting repetitions of TB n and four CG-PUSCHs (e.g., CG-PUSCHs 260-263) for transmitting repetitions of TB n+1 may be prepared for 8 CG resources in a certain CG period. Assuming that the RV pattern {0, 2, 3, 1} is applied to the four repetitions of both TB n and TB n+1, CG-PUSCHs 250-253 may carry RV0, RV2, RV3, and RV1 of TB n, respectively, and CG-PUSCHs 260-263 may carry RV0, RV2, RV3, and RV1 of TB n+1, respectively.

In some embodiments of the present disclosure, candidate CG-PUSCH resources are contiguously configured in time domain without any gaps between any two consecutive resources. Referring to FIG. 2, as shown at line 220, when a channel access procedure (e.g., an LBT procedure) for the first CG-PUSCH (e.g., CG-PUSCH 250) carrying RV0 of TB n is successful, all eight CG-PUSCHs (i.e., CG-PUSCHs 250-253 and 260-263) prepared for the eight CG resources can be transmitted one by one without performing any LBT for the other seven CG-PUSCHs. For example, RV0, RV2, RV3, and RV1 of TB n are respectively transmitted on CG-PUSCHs 250-253, and RV0, RV2, RV3, and RV1 repetitions of TB n+1 are respectively transmitted on CG-PUSCHs 260-263.

When the LBT fails, the UE needs to handle the transmission of TB repetitions on the unlicensed spectrum. For example, assuming that the LBTs for the first two CG-PUSCHs (e.g., CG-PUSCHs 250 and 251) fail, and the LBT for the third CG-PUSCH (e.g., CG-PUSCHs 252) is successful, a UE may handle the transmission of the TB repetitions on the unlicensed spectrum according to one of the following schemes.

Scheme A: referring to FIG. 2, at line 230, the UE may clear or flush out from its buffer the prepared first two repetitions (e.g., RV0 and RV2) of TB n which were supposed to be transmitted on CG-PUSCHs 250 and 251, and may transmit the remaining repetitions (e.g., RV3 and RV1) of TB n on CG-PUSCHs 252 and 253. The UE may further transmit the four repetitions (e.g., RV0, RV2, RV3, and RV1) of TB n+1 on CG-PUSCHs 260-263.

Scheme B: referring to FIG. 2, at line 240, the UE may start its transmission from the third CG resource (e.g., CG-PUSCH 252). For example, the UE may transmit the first two repetitions (e.g., RV0 and RV2) of TB n on CG-PUSCHs 252 and 253, and transmit the remaining repetitions (e.g., RV3 and RV1) of TB n on CG CG-PUSCHs 260 and 261 which are intended for the transmission of TB n+1. The transmission of the repetitions of TB n+1 may be shifted to the end of the transmission of the repetitions of TB n. For example, the UE may transmit the first two repetitions (e.g., RV0 and RV2) of TB n+1 on CG-PUSCHs 262 and 263. The remaining repetitions (e.g., RV3 and RV1) of TB n+1 may be postponed to the next CG transmission period within the same CG configuration. For example, RV3 and RV1 of TB n+1 may be transmitted on CG-PUSCHs 270 and 271 in the next CG transmission period.

The merit of scheme A is that the implementation at a UE is simple since the UE does not need to keep the repetitions failed to be transmitted on the configured resources in its memory, and does not needed to re-prepare all the TB repetitions from the earliest available CG resource (e.g., CG-PUSCH 252 at line 230 of FIG. 2). It is especially true when the earliest available CG resource has a different number of OFDM symbols compared to the CG resource with failed LBT procedure, where the UE cannot complete rate-matching, resource mapping and transmission as soon as the LBT for the earliest available CG-resource is finished, due to processing capability constraints of the UE. Moreover, moving the last several repetitions of TB n+1 to a next CG period may increase the transmission delay of TB n+1, especially when a CG period is large or traffic is somewhat urgent.

On the other hand, scheme A may lead to a high probability of incorrect decoding of TB n since only a part of the repetitions of TB n (e.g., RV3 and RV1) are transmitted and the repetitions (e.g., RV0 and RV2) failed to be transmitted due to LBT failure are dropped. Since RV0 may include the most systematic bits, it is essential for the decoding of the corresponding TB. This is similar to dynamic scheduling of a TB in UL and DL where when an initial transmission is missed by the receiver, the transmitter may have to retransmit RV0 in a subsequent retransmission. Hence, scheme A may be relative less reliable than scheme B.

Embodiments of the present disclosure further provide solutions to improve the transmission of TB repetitions on CG resources in a wireless communication system such as an NR-U (NR system access on an unlicensed spectrum) system that may operate on shared spectrum access. More details on the embodiments of the present disclosure will be illustrated in the following text in combination with the appended drawings.

The expression "performing an LBT for a repetition of a TB" may be used herein to refer to performing an LBT for a CG-PUSCH carrying the repetition. The expression "transmitting a CG-PUSCH carrying a repetition" may be used herein to refer to transmitting the repetition on the CG-PUSCH. The expression "preparing CG-PUSCHs" may be used herein to mean generating CG-PUSCHs for carrying repetitions or generating repetitions to be transmitted on corresponding CG-PUSCHs.

In some embodiments of the present disclosure, instead of using RV patterns such as {0, 2, 3, 1} and {0, 3, 0, 3}, a UE may use an RV pattern selected from a set of RV patterns configured by an RRC signalling message or predefined at a UE (e.g., predefined in standard) for TB repetition transmissions, and the set of the RV pattern may satisfy the following principle: placing the RV including the most systematic bits of a TB at the last repetition of the TB.

The RV pattern satisfying the above principle may hereinafter be referred to as a "new RV pattern," and the RV pattern not satisfying the above principle may hereinafter be referred to as an "old RV pattern." However, the words "new" and "old" are only used to differentiate whether the above principle is taken into account or not, but not to be used to limit the substance of the present disclosure.

Assuming that RV0 includes the most systematic bits, RV0 is placed at the last repetition of a TB. Table 1 below shows an exemplary set of RV patterns in consideration of the above principle. It should be understood that Table 1 is only for illustrative purposes, and should not be construed as limiting the embodiments of the present disclosure.

TABLE 1

| Index | RV pattern (repK = 2) | RV pattern (repK = 4) | RV pattern (repK = 8) |
| --- | --- | --- | --- |
| 0 | {2, 0} | {1, 3, 2, 0} | {1, 3, 2, 0, 1, 3, 2, 0} |
| 1 | {3, 0} | {3, 0, 3, 0} | {1, 1, 3, 3, 2, 2, 0, 0} |
| 2 | {0, 0} | {0, 0, 0, 0} | {3, 0, 3, 0, 3, 0, 3, 0} |
| 3 |  |  | {3, 3, 3, 3, 0, 0, 0, 0} |

By adopting the above principle, the RV (e.g., RV0) including the most systematic bits of a TB is placed at the safest position since an LBT is performed from the first candidate CG occasion (e.g., corresponding to the first CG-PUSCH in a CG period) to the next.

In some embodiments of the present disclosure, when more than one TB is to be transmitted within one CG period, only some of the TBs (e.g., the first TB) to be transmitted within each CG period may employ new RV patterns (e.g., the RV patterns listed in Table 1), and the remaining TBs to be transmitted in the same CG period may employ old RV patterns that do not necessarily follow the above principle. For example, {1, 3, 2, 0} or {3, 0, 3, 0} may be applied to the first TB to be transmitted in a certain CG period and {0, 2, 3, 1} or {0, 3, 0, 3} may be applied to the remaining TB(s) to be transmitted in the same CG period.

Such combined usage of RV patterns in one CG period is beneficial since it can not only improve transmission reliability of, for example, the first TB, but also reduce decoding delay of the other TBs. This is because old RV patterns such as {0, 2, 3, 1} and {0, 3, 0, 3} place RV0 in the first TB repetition which can reduce the decoding delay, especially when RV0 is decoded successfully in a one-shot detection.

In some other embodiments of the present disclosure, when more than one TB is to be transmitted within one CG period, each TB to be transmitted within the same CG period may employ a new RV pattern (e.g., one of those listed in Table 1). The TBs to be transmitted within the same CG period may employ the same or different RV patterns.

In some embodiments of the present disclosure, configured grant uplink control information (CG-UCI) on an associated CG-PUSCH may indicate the RV index. Based on the RV index in the CG-UCI, a receiver (e.g., a base station) can know exactly which RV is transmitted in the associated CG-PUSCH.

There are several alternative solutions for handling TB repetition transmission on an unlicensed spectrum. In these alternative solutions, new RV patterns may be employed.

In some embodiments of the present disclosure, it is assumed that for each TB to be transmitted in a CG period, a UE may prepare M CG-PUSCHs, which may carry M repetitions of each TB and may correspond to M CG occasions. M is the configured number of repetitions for each TB, for example, repK. For the first TB be transmitted in a certain CG period, the UE may behave as below.

If a channel access procedure (e.g., LBT procedure) for the first CG occasion in the CG period is successful, the prepared M CG-PUSCHs for the first TB as well as the remaining TBs (if any) are transmitted contiguously in time domain without any gaps.

If the LBT procedures for the first N consecutive CG occasions in the CG period fail, and an LBT procedure succeeds at the (N+1)th CG occasion, where 0<N<M, the UE may drop the first N CG-PUSCHs prepared for the first N CG occasions and contiguously transmit the last (M-N) CG-PUSCHs prepared for the last (M-N) CG occasions on the corresponding CG occasions. The UE may contiguously transmit the prepared M CG-PUSCHs for the remaining TBs (if any) in time domain without any gaps.

If the LBT procedures for all the CG occasions of the first TB fail, the first TB may be delayed to the next CG period within the same CG configuration. The UE may then perform a similar procedure for the next TB (if any) in the same CG period.

In these embodiments, new RV patterns (e.g., RV patterns listed in Table 1) may be applied to TBs. Since RV0 is placed in the last repetition, it may have a relatively higher probability to be transmitted compared to preceding TB repetitions. Also, in these embodiments, a UE may not need to regenerate any new CG-PUSCHs for adapting the practical available CG resource. As a result, the UE implementation is simple while the transmission reliability is improved.

Figure 3:
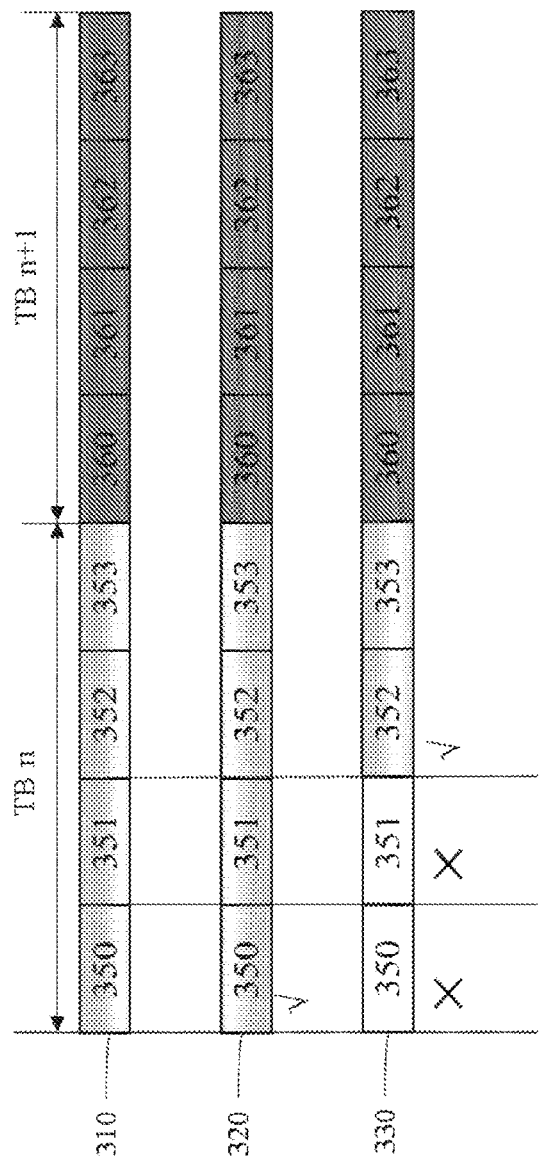
FIG. 3 illustrates an example of an uplink transmission of repetitions of a transport block according an RV pattern in accordance with some embodiments of the present disclosure.

FIG. 3 illustrates an example of an uplink transmission of repetitions of a transport block according an RV pattern in accordance with the above embodiments of the present disclosure. It should be understood that the configurations mentioned in the following text are only for illustrative purposes, and should not be construed as limiting the embodiments of the present disclosure. Also, details described in all of the foregoing embodiments of the present disclosure are applicable for the embodiments shown in FIG. 3.

Assuming that 8 consecutive CG-PUSCHs are configured by a given CG configuration and repK is configured as 4, two TBs (e.g., TB n and TB n+1 as shown in FIG. 3) may be prepared to be transmitted on the 8 CG resources/occasions within one CG period.

In some embodiments of the present disclosure, new RV patterns may be applied to both TB n and TB n+1. The new RV patterns for TB n and TB n+1 may be the same or different. For example, a UE may select an RV pattern (e.g., {1, 3, 2, 0}) from the set of RV patterns listed in above Table 1 for both TB n and TB n+1.

According to the selected RV pattern, the UE may then prepare four repetitions (e.g., RV1, RV3, RV2, and RV0) of TB n corresponding to the first 4 consecutive candidate CG occasions and 4 repetitions (e.g., RV1, RV3, RV2, and RV0) of TB n+1 corresponding to the last 4 consecutive candidate CG occasions. Referring to FIG. 3, line 310 shows four CG-PUSCHs (e.g., CG-PUSCHs 350-353) for transmitting repetitions (e.g., RV1, RV3, RV2, and RV0) of TB n and four CG-PUSCHs (e.g., CG-PUSCHs 360-363) for transmitting repetitions (e.g., RV1, RV3, RV2, and RV0) of TB n+1. That is, CG-PUSCHs 350-353 may carry RV1, RV3, RV2, and RV0 of TB n, respectively; and CG-PUSCHs 360-363 may carry RV1, RV3, RV2, and RV0 of TB n+1, respectively.

In some embodiments of the present disclosure, preparing repetitions for TB n+1 may be simultaneously done while performing channel access procedure(s) for TB n or transmitting the repetitions of TB n.

The UE may perform a channel access procedure (e.g., an LBT procedure) at the first candidate CG occasion (e.g., CG-PUSCH 350). When the LBT procedure for the first CG-PUSCH carrying the first repetition (e.g., RV1) of TB n is successful, then all the eight CG-PUSCHs prepared for the eight CG resources are transmitted together without performing any LBT procedures for the other seven CG-PUSCHs. For example, referring to FIG. 3, as shown at line 320, when an LBT procedure for CG-PUSCH 350 carrying RV1 of TB n is successful, CG-PUSCHs 350-353 respectively carrying RV1, RV3, RV2, and RV0 of TB n, and CG-PUSCHs 360-363 respectively carrying RV1, RV3, RV2, and RV0 of TB n+1 are transmitted one by one, without performing any LBT procedure for the other seven CG-PUSCHs.

In some embodiments of the present disclosure, the LBT procedure may fail. For example, as shown in FIG. 3, at line 330, the LBT procedures for the first two CG-PUSCH transmission occasions (e.g., CG-PUSCHs 350 and 351 carrying RV1 and RV3 of TB n) may fail. However, the LBT procedure for the third CG-PUSCH transmission occasion (e.g., CG-PUSCH 352 carrying RV2 of TB n) may succeed. In this scenario, the UE may drop RV1 and RV3 of TB n, and may start transmitting RV2 and RV0 of TB n on CG-PUSCHs 352 and 353, respectively, followed by RV1, RV3, RV2, and RV0 of TB n+1 on CG-PUSCHs 360-363, respectively.

In some embodiments of the present disclosure, the combined usage of RV patterns may be employed. For example, a UE may select one RV pattern (e.g., {1, 3, 2, 0}) from the set of RV patterns listed in above Table 1 for TB n, and may determine an old RV pattern (e.g., {0, 2, 3, 1}) for TB n+1.

According to the selected RV patterns, the UE may then prepare four repetitions (e.g., RV1, RV3, RV2, and RV0) of TB n corresponding to the first 4 consecutive candidate CG occasions and 4 repetitions (e.g., RV0, RV2, RV3, and RV1)

of TB n+1 corresponding to the last 4 consecutive candidate CG occasions. In this scenario, at line 310 of FIG. 3, CG-PUSCHs 350-353 may carry RV1, RV3, RV2, and RV0 of TB n, respectively; and CG-PUSCHs 360-363 may carry RV0, RV2, RV3, and RV1 of TB n+1, respectively.

In some embodiments of the present disclosure, preparing repetitions for TB n+1 may be simultaneously done while performing channel access procedure(s) for TB n or transmitting the repetitions of TB n.

The UE may perform a channel access procedure (e.g., an LBT procedure) at the first candidate CG occasion (e.g., CG-PUSCH 350). When the LBT procedure for the first CG-PUSCH carrying the first repetition (e.g., RV1) of TB n is successful, then all the eight CG-PUSCHs prepared for the eight CG resources are transmitted together without performing any LBT procedures for the other seven CG-PUSCHs. For example, referring to FIG. 3, as shown at line 320, when an LBT procedure for CG-PUSCH 350 carrying RV1 of TB n is successful, CG-PUSCHs 350-353 respectively carrying RV1, RV3, RV2, and RV0 of TB n, and CG-PUSCHs 360-363 respectively carrying RV0, RV2, RV3, and RV1 of TB n+1 are transmitted one by one, without performing any LBT procedure for the other seven CG-PUSCHs.

In some embodiments of the present disclosure, the LBT procedure may fail. For example, as shown in FIG. 3, at line 330, the LBT procedures for the first two CG-PUSCH transmission occasions (e.g., CG-PUSCHs 350 and 351 carrying RV1 and RV3 of TB n) may fail. However, the LBT procedure for the third CG-PUSCH transmission occasion (e.g., CG-PUSCH 352 carrying RV2 of TB n) may succeed. In this scenario, the UE may drop RV1 and RV3 of TB n, and may start transmitting RV2 and RV0 of TB n on CG-PUSCHs 352 and 353, respectively, followed by RV0, RV2, RV3, and RV1 of TB n+1 on CG-PUSCHs 360-363, respectively.

In some embodiments of the present disclosure, it is assumed that for each TB to be transmitted in a CG period, a UE may prepare M CG-PUSCHs, which may carry M repetitions of each TB and may correspond to M CG occasions. M is the configured number of repetitions for each TB, for example, repK. For the first TB be transmitted in a certain CG period, the UE may behave as below.

If a channel access procedure (e.g., LBT procedure) for the first CG occasion in the CG period is successful, the prepared M CG-PUSCHs for the first TB as well as the remaining TBs (if any) are transmitted contiguously in time domain without any gaps.

If the LBT procedures for the first N consecutive CG occasions in the CG period fail, and an LBT procedure succeeds at the (N+1)th CG occasion, where 0<N<M, the UE may contiguously transmit the last (M−N) CG-PUSCHs prepared for the last (M−N) CG occasions on the corresponding CG occasions.

Regarding the first N CG-PUSCHs prepared for the first N CG occasions in which the LBT procedure failure occurs, the UE may handle them according to one of the following options:

(1) Option 1: the first N repetitions of the TB may be suspended and not flushed out from the buffer or memory of the UE. If an acknowledgement (ACK) corresponding to this TB is received before the start of the next CG period, the UE may clear or flush out these N repetitions of the TB. If an ACK corresponding to this TB is not received, for example, a negative ACK (NACK) or no HARQ-ACK feedback is received for this TB before the start of the next CG period, the UE may try to transmit these N repetitions on the first N CG occasions of the next CG period. An exemplary embodiment will be described with respect to FIG. 4.

(2) Option 2: the first N repetitions of the TB may be transmitted on the first N CG occasions reserved for the next TB (if any) in the same CG period following the last (M-N) repetitions of the TB. Accordingly, due to the shift of N repetitions of the current TB, the first N repetitions of the next TB may be suspended. If an ACK corresponding to the next TB is received before the start of the next CG period, the UE may clear or flush out these N repetitions (first N repetitions) of the next TB. If an ACK corresponding to the next TB is not received, for example, an NACK or no HARQ-ACK feedback is received for the next TB before the start of the next CG period, the UE may try to transmit these N repetitions of the next TB on the first N CG occasions of the next CG period. An exemplary embodiment will be described with respect to FIG. 5.

(3) Option 3: the first N repetitions of the TB may be transmitted on the first N CG occasions reserved for the next TB (if any) in the same CG period following the last (M-N) repetitions of the TB. Meanwhile, due to the shift of N repetitions from the current TB, the first (M-N) repetitions of the next TB may also be shifted and the last N repetitions of the next TB may be suspended. If an ACK corresponding to the next TB is received before the start of the next CG period, the UE may clear or flush out these N repetitions (last N repetitions) of the next TB. If an ACK corresponding to the next TB is not received, for example, an NACK or no HARQ-ACK feedback is received for the next TB before the start of the next CG period, the UE may try to transmit these N repetitions of the next TB on the first N CG occasions of the next CG period. An exemplary embodiment will be described with respect to FIG. 6.

If the LBT procedures for all the CG occasions of the first TB fail, the first TB may be delayed to the next CG period within the same CG configuration. The UE may then perform a similar procedure for the next TB (if any) in the same CG period.

These embodiments can guarantee the transmission of the configured number (e.g., repK) of repetitions of each TB, and therefore are relative more reliable.

Moreover, in some examples of the above embodiments, old RV patterns (e.g., {0, 2, 3, 1} or {0, 3, 0, 3}) may be applied to all TBs to be transmitted within the same CG period. In some other examples of the above embodiments, the combined usage of RV patterns may be employed. That is, new RV patterns (e.g., RV patterns listed in Table 1) may be applied to some TBs. As mentioned above, with RV0 being placed in the last repetition, it may have a relatively higher probability to be transmitted. For example, a UE may select a new RV pattern (e.g., {1, 3, 2, 0} or {3, 0, 3, 0}) for the first TB of a plurality of TBs to be transmitted within a CG period, and may select an old RV pattern (e.g., {0, 2, 3, 1} or {0, 3, 0, 3}) for the remaining TB(s) of the plurality of TBs. The usage of a new RV pattern and an old RV pattern in the same CG period can not only improve transmission reliability of the first TB, but also reduce the decoding delay of the other TB(s). In yet other embodiments of the present disclosure, new RV patterns may be applied to all TBs to be transmitted within the same CG period. The same or different RV patterns may be applied to the TBs to be transmitted within the same CG period.

In some embodiments of the present disclosure, the CG-UCI on an associated CG-PUSCH may indicate an RV index. Based on the RV index in the CG-UCI, a receiver (e.g., a base station) can know exactly which RV is transmitted in the associated CG-PUSCH.

Figure 4:
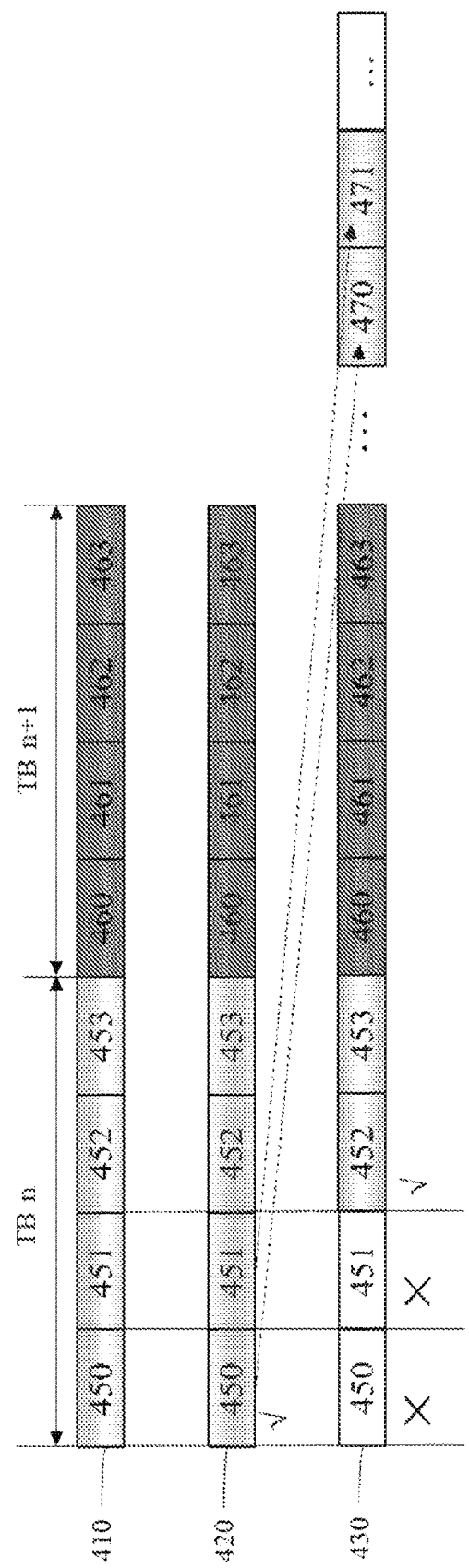
FIG. 4 illustrates an example of an uplink transmission of repetitions of a transport block according an RV pattern in accordance with some embodiments of the present disclosure.

FIG. 4 illustrates an example of an uplink transmission of repetitions of a transport block according an RV pattern in accordance with the above embodiments of the present disclosure. It should be understood that the configurations mentioned in the following text are only for illustrative purposes, and should not be construed as limiting the embodiments of the present disclosure. Also, details described in all of the foregoing embodiments of the present disclosure are applicable for the embodiments shown in FIG. 4.

Assuming that 8 consecutive CG-PUSCHs are configured by a given CG configuration and repK is configured as 4, two TBs (e.g., TB n and TB n+1 as shown in FIG. 4) may be prepared to be transmitted on the 8 CG resources/occasions within one CG period. A UE may select an RV pattern (e.g., {1, 3, 2, 0}) from the set of RV patterns listed in above Table 1 for both TB n and TB n+1.

According to the selected RV pattern, the UE may then prepare four repetitions (e.g., RV1, RV3, RV2, and RV0) of TB n corresponding to the first 4 consecutive candidate CG occasions and 4 repetitions (e.g., RV1, RV3, RV2, and RV0) of TB n+1 corresponding to the last 4 consecutive candidate CG occasions. Referring to FIG. 4, line 410 shows four CG-PUSCHs (e.g., CG-PUSCHs 450-453) for transmitting repetitions (e.g., RV1, RV3, RV2, and RV0) of TB n and four CG-PUSCHs (e.g., CG-PUSCHs 460-463) for transmitting repetitions (e.g., RV1, RV3, RV2, and RV0) of TB n+1. That is, CG-PUSCHs 450-453 may carry RV1, RV3, RV2, and RV0 of TB n, respectively; and CG-PUSCHs 460-463 may carry RV1, RV3, RV2, and RV0 of TB n+1, respectively.

In some embodiments of the present disclosure, preparing repetitions for TB n+1 may be simultaneously done while performing channel access procedure(s) for TB n or transmitting the repetitions of TB n.

The UE may perform a channel access procedure (e.g., an LBT procedure) at the first candidate CG occasion (e.g., CG-PUSCH 450). When the LBT procedure for the first CG-PUSCH carrying the first repetition (e.g., RV1) of TB n is successful, then all the eight CG-PUSCHs prepared for the eight CG resources are transmitted together without performing any LBT procedures for the other seven CG-PUSCHs. For example, referring to FIG. 4, as shown at line 420, when an LBT procedure for CG-PUSCH 450 carrying RV1 of TB n is successful, CG-PUSCHs 450-453 respectively carrying RV1, RV3, RV2, and RV0 of TB n, and CG-PUSCHs 460-463 respectively carrying RV1, RV3, RV2, and RV0 of TB n+1 are transmitted one by one, without performing any LBT procedure for the other seven CG-PUSCHs.

In some embodiments of the present disclosure, the LBT procedure may fail. For example, as shown in FIG. 4, at line 430, the LBT procedures for the first two CG-PUSCH transmission occasions (e.g., CG-PUSCHs 450 and 451 carrying RV1 and RV3 of TB n) may fail. However, the LBT procedure for the third CG-PUSCH transmission occasion (e.g., CG-PUSCH 452 carrying RV2 of TB n) may succeed. In this scenario, the UE may suspend RV1 and RV3 of TB n and not flush out RV1 and RV3 of TB n from its buffer. The UE may transmit RV2 and RV0 of TB n on CG-PUSCHs 452 and 453, respectively, followed by RV1, RV3, RV2, and RV0 of TB n+1 on CG-PUSCHs 460-463, respectively.

The UE may determine whether an ACK corresponding to TB n is received or not. If the case that an ACK corresponding to TB n is received before the start of the next CG period, the UE will flush out RV1 and RV3 of TB n from its buffer. If the case that an NACK corresponding to TB n is received or no HARQ-ACK feedback is received for TB n before the start of the next CG period, the UE may try to transmit RV1 and RV3 of TB n on the first two CG occasions of the next CG period. For example, as denoted in dotted arrows in FIG. 4, the UE may transmit RV1 and RV3 of TB non CG-PUSCHs 470 and 471, respectively.

Although the same new RV pattern is applied to TB n and TB n+1 in the above example, it should be appreciated by persons skilled in the art that a new RV pattern and an old RV pattern may be applied to TB n and TB n+1, respectively. Moreover, different new RV patterns, different old RV patterns, or the same old RV pattern may be applied to TB n and TB n+1.

Figure 5:
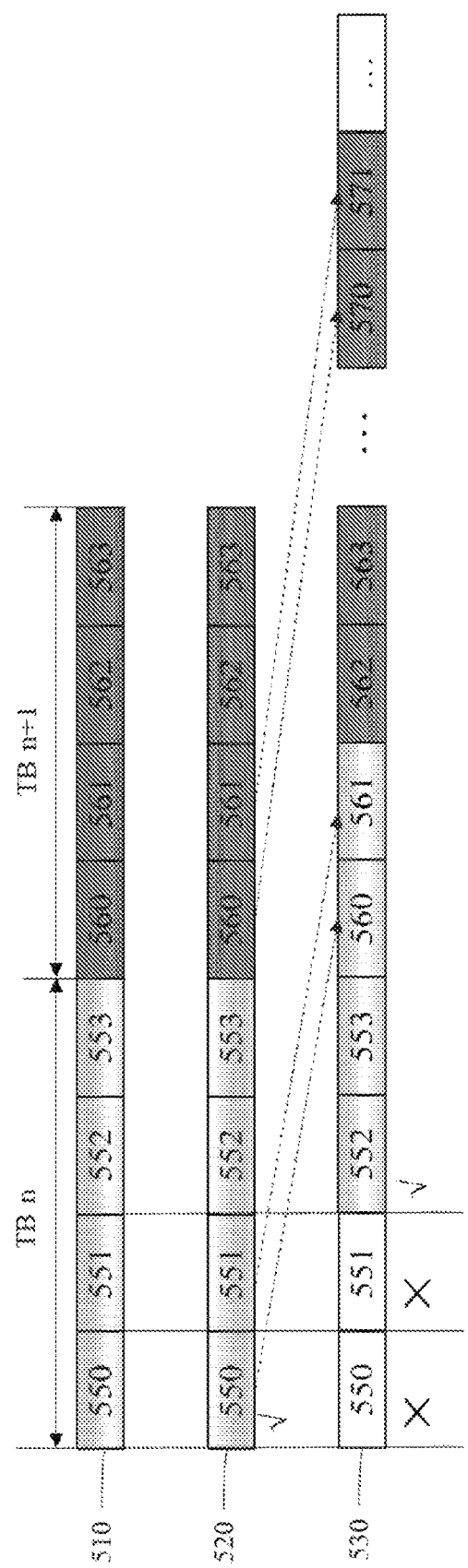
FIG. 5 illustrates an example of an uplink transmission of repetitions of a transport block according an RV pattern in accordance with some embodiments of the present disclosure.

FIG. 5 illustrates an example of an uplink transmission of repetitions of a transport block according an RV pattern in accordance with the above embodiments of the present disclosure. It should be understood that the configurations mentioned in the following text are only for illustrative purposes, and should not be construed as limiting the embodiments of the present disclosure. Also, details described in all of the foregoing embodiments of the present disclosure are applicable for the embodiments shown in FIG. 5.

Assuming that 8 consecutive CG-PUSCHs are configured by a given CG configuration and repK is configured as 4, two TBs (e.g., TB n and TB n+1 as shown in FIG. 5) may be prepared to be transmitted on the 8 CG resources/occasions within one CG period. A UE may select an RV pattern (e.g., {1, 3, 2, 0}) from the set of RV patterns listed in above Table 1 for both TB n and TB n+1.

According to the selected RV pattern, the UE may then prepare four repetitions (e.g., RV1, RV3, RV2, and RV0) of TB n corresponding to the first 4 consecutive candidate CG occasions and 4 repetitions (e.g., RV1, RV3, RV2, and RV0) of TB n+1 corresponding to the last 4 consecutive candidate CG occasions. Referring to FIG. 5, line 510 shows four CG-PUSCHs (e.g., CG-PUSCHs 550-553) for transmitting repetitions (e.g., RV1, RV3, RV2, and RV0) of TB n and four CG-PUSCHs (e.g., CG-PUSCHs 560-563) for transmitting repetitions (e.g., RV1, RV3, RV2, and RV0) of TB n+1. That is, CG-PUSCHs 550-553 may carry RV1, RV3, RV2, and RV0 of TB n, respectively; and CG-PUSCHs 560-563 may carry RV1, RV3, RV2, and RV0 of TB n+1, respectively.

In some embodiments of the present disclosure, preparing repetitions for TB n+1 may be simultaneously done while performing channel access procedure(s) for TB n or transmitting the repetitions of TB n.

The UE may perform a channel access procedure (e.g., an LBT procedure) at the first candidate CG occasion (e.g., CG-PUSCH 550). When the LBT procedure for the first CG-PUSCH carrying the first repetition (e.g., RV1) of TB n is successful, then all the eight CG-PUSCHs prepared for the eight CG resources are transmitted together without performing any LBT procedures for the other seven CG-PUSCHs. For example, referring to FIG. 5, as shown at line 520, when an LBT procedure for CG-PUSCH 550 carrying RV1 of TB n is successful, CG-PUSCHs 550-553 respectively carrying RV1, RV3, RV2, and RV0 of TB n, and CG-PUSCHs 560-563 respectively carrying RV1, RV3, RV2, and RV0 of TB n+1 are transmitted one by one, without performing any LBT procedure for the other seven CG-PUSCHs.

In some embodiments of the present disclosure, the LBT procedure may fail. For example, as shown in FIG. 5, at line 530, the LBT procedures for the first two CG-PUSCH transmission occasions (e.g., CG-PUSCHs 550 and 551 carrying RV1 and RV3 of TB n) may fail. However, the LBT procedure for the third CG-PUSCH transmission occasion (e.g., CG-PUSCH 552 carrying RV2 of TB n) may succeed. In this scenario, the UE may suspend RV1 and RV3 of TB n and not flush out RV1 and RV3 of TB n from its buffer. The UE may transmit RV2 and RV0 of TB n on CG-PUSCHs 552 and 553, respectively.

The UE may transmit RV1 and RV3 of TB n on the first two CG occasions reserved for TB n+1. For example, as denoted in dotted arrows in FIG. 5, the UE may transmit RV1 and RV3 of TB n on CG-PUSCHs 560 and 561, respectively. Accordingly, due to the shift of the two repetitions (RV1 and RV3) of TB n, the first two repetitions (RV1 and RV3) of TB n+1 may be suspended and kept in the buffer of the UE.

The UE may determine whether an ACK corresponding to TB n+1 is received or not. If the case that an ACK corresponding to TB n+1 is received before the start of the next CG period, the UE will flush out RV1 and RV3 of TB n+1 from its buffer. If the case that an NACK corresponding to TB n+1 is received or no HARQ-ACK feedback is received for TB n+1 before the start of the next CG period, the UE may try to transmit RV1 and RV3 of TB n+1 on the first two CG occasions of the next CG period. For example, as denoted in dotted arrow in FIG. 5, the UE may transmit RV1 and RV3 of TB n+1 on CG-PUSCHs 570 and 571, respectively.

Although the same new RV pattern is applied to TB n and TB n+1 in the above example, it should be appreciated by persons skilled in the art that a new RV pattern and an old RV pattern may be applied to TB n and TB n+1, respectively. Moreover, different new RV patterns, different old RV patterns, or the same old RV pattern may be applied to TB n and TB n+1.

Figure 6:
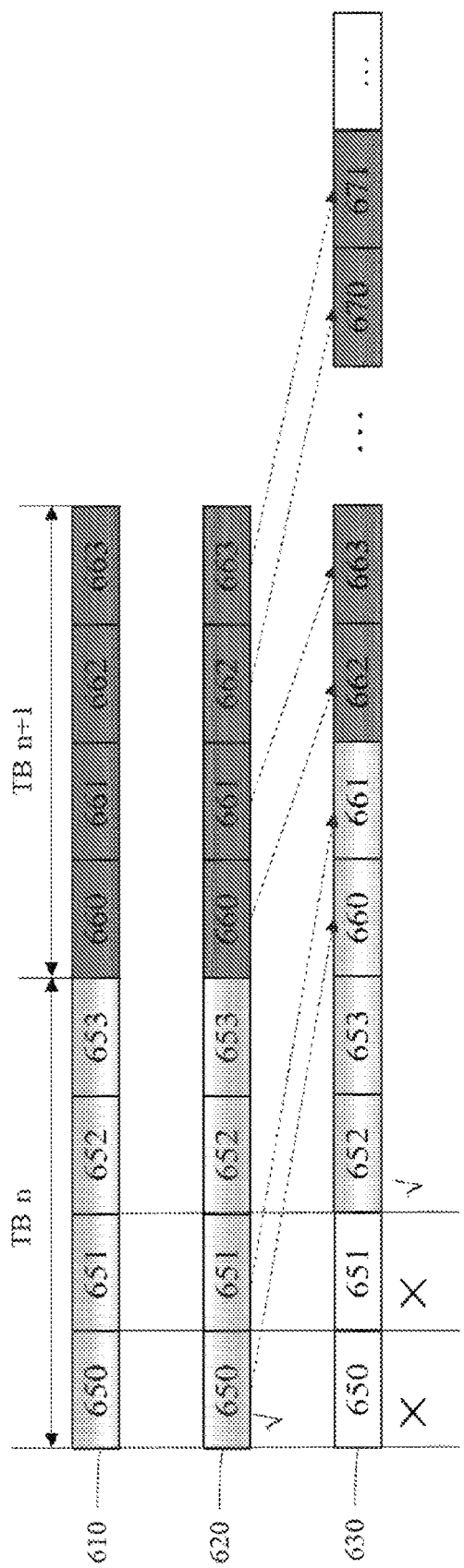
FIG. 6 illustrates an example of an uplink transmission of repetitions of a transport block according an RV pattern in accordance with some embodiments of the present disclosure.

FIG. 6 illustrates an example of an uplink transmission of repetitions of a transport block according an RV pattern in accordance with the above embodiments of the present disclosure. It should be understood that the configurations mentioned in the following text are only for illustrative purposes, and should not be construed as limiting the embodiments of the present disclosure. Also, details described in all of the foregoing embodiments of the present disclosure are applicable for the embodiments shown in FIG. 6.

Assuming that 8 consecutive CG-PUSCHs are configured by a given CG configuration and repK is configured as 4, two TBs (e.g., TB n and TB n+1 as shown in FIG. 6) may be prepared to be transmitted on the 8 CG resources/occasions within one CG period. A UE may select an RV pattern (e.g., {1, 3, 2, 0}) from the set of RV patterns listed in above Table 1 for both TB n and TB n+1.

According to the selected RV pattern, the UE may then prepare four repetitions (e.g., RV1, RV3, RV2, and RV0) of TB n corresponding to the first 4 consecutive candidate CG occasions and 4 repetitions (e.g., RV1, RV3, RV2, and RV0) of TB n+1 corresponding to the last 4 consecutive candidate CG occasions. Referring to FIG. 6, line 610 shows four CG-PUSCHs (e.g., CG-PUSCHs 650-653) for transmitting repetitions (e.g., RV1, RV3, RV2, and RV0) of TB n and four CG-PUSCHs (e.g., CG-PUSCHs 660-663) for transmitting repetitions (e.g., RV1, RV3, RV2, and RV0) of TB n+1. That is, CG-PUSCHs 650-653 may carry RV1, RV3, RV2, and RV0 of TB n, respectively; and CG-PUSCHs 660-663 may carry RV1, RV3, RV2, and RV0 of TB n+1, respectively.

In some embodiments of the present disclosure, preparing repetitions for TB n+1 may be simultaneously done while performing channel access procedure(s) for TB n or transmitting the repetitions of TB n.

The UE may perform a channel access procedure (e.g., an LBT procedure) at the first candidate CG occasion (e.g., CG-PUSCH 650). When the LBT procedure for the first CG-PUSCH carrying the first repetition (e.g., RV1) of TB n is successful, then all the eight CG-PUSCHs prepared for the eight CG resources are transmitted together without performing any LBT procedures for the other seven CG-PUSCHs. For example, referring to FIG. 6, as shown at line 520, when an LBT procedure for CG-PUSCH 650 carrying RV1 of TB n is successful, CG-PUSCHs 650-653 respectively carrying RV1, RV3, RV2, and RV0 of TB n, and CG-PUSCHs 660-663 respectively carrying RV1, RV3, RV2, and RV0 of TB n+1 are transmitted one by one, without performing any LBT procedure for the other seven CG-PUSCHs.

In some embodiments of the present disclosure, the LBT procedure may fail. For example, as shown in FIG. 6, at line 630, the LBT procedures for the first two CG-PUSCH transmission occasions (e.g., CG-PUSCHs 650 and 651 carrying RV1 and RV3 of TB n) may fail. However, the LBT procedure for the third CG-PUSCH transmission occasion (e.g., CG-PUSCH 652 carrying RV2 of TB n) may succeed. In this scenario, the UE may suspend RV1 and RV3 of TB n and not flush out RV1 and RV3 of TB n from its buffer. The UE may transmit RV2 and RV0 of TB n on CG-PUSCHs 652 and 653, respectively.

The UE may transmit RV1 and RV3 of TB n on the first two CG occasions reserved for TB n+1. For example, as denoted in dotted arrows in FIG. 6, the UE may transmit RV1 and RV3 of TB n on CG-PUSCHs 660 and 661, respectively. Due to the shift of the two repetitions (RV1 and RV3) of TB n, the first two repetitions (RV1 and RV3) of TB n+1 may also be shifted. For example, as denoted in dotted arrow in FIG. 6, the UE may transmit RV1 and RV3 of TB n+1 on CG-PUSCHs 662 and 663, respectively. Accordingly, the last two repetitions (RV2 and RV0) of TB n+1 are suspended and kept in the buffer of the UE.

The UE may determine whether an ACK corresponding to TB n+1 is received or not. If the case that an ACK corresponding to TB n+1 is received before the start of the next CG period, the UE will flush out RV2 and RV0 of TB n+1 from its buffer. If the case that an NACK corresponding to TB n+1 is received or no HARQ-ACK feedback is received for TB n+1 before the start of the next CG period, the UE may try to transmit RV2 and RV0 of TB n+1 on the first two CG occasions of the next CG period. For example, as denoted in dotted arrow in FIG. 6, the UE may transmit RV2 and RV0 of TB n+1 on CG-PUSCHs 670 and 671, respectively.

Although the same new RV pattern is applied to TB n and TB n+1 in the above example, it should be appreciated by persons skilled in the art that a new RV pattern and an old RV pattern may be applied to TB n and TB n+1, respectively. Moreover, different new RV patterns, different old RV patterns, or the same old RV pattern may be applied to TB n and TB n+1.

In some embodiments of the present disclosure, it is assumed that for each TB to be transmitted in a CG period, a UE may prepare M CG-PUSCHs, which may carry M repetitions of each TB and may correspond to M CG occasions. M is the configured number of repetitions for each TB, for example, repK. For the first TB be transmitted in a certain CG period, the UE may behave as below.

- If a channel access procedure (e.g., LBT procedure) for the first CG occasion in the CG period is successful, the prepared M CG-PUSCHs for the first TB as well as the remaining TBs (if any) are transmitted contiguously in time domain without any gaps.
- If the LBT procedures for the first N consecutive CG occasions in the CG period fail, and an LBT procedure succeeds at the $(N+1)^{th}$ CG occasion, where 0<N<M, the UE may firstly transmit the $(N+1)^{th}$ CG-PUSCHs carrying the $(N+1)^{th}$ repetition of the TB. Assuming that the duration of one CG occasion is sufficient for the UE to regenerate a new CG-PUSCH, during the transmission of the $(N+1)^{th}$ CG-PUSCH, the UE may finish the generation of a new CG-PUSCH carrying the repetition having the RV with the most systematic bits (e.g., RV0). This newly generated CG-PUSCH may be transmitted immediately following the $(N+1)^{th}$ CG-PUSCH. Similarly, during the transmission of the CG-PUSCH carrying RV0, the UE may finish the generation of another new CG-PUSCH carrying a repetition with one (e.g., RV2) of the remaining RVs according to the selected RV pattern. Then, this new CG-PUSCH carrying RV2 is transmitted immediately following the CG-PUSCH carrying RV0. A similar parallel procedure is applied to other remaining repetitions of the current TB and the first (M-N) repetitions of the next TB (if any). The UE will try to transmit the remaining N repetitions of the next TB in next the CG period if no ACK is received for the next TB.
- If the LBT procedures for all the CG occasions of the first TB fail, the first TB may be delayed to the next CG period within the same CG configuration. The UE may then perform a similar procedure for the next TB (if any) in the same CG period.

In the above embodiments, old RV patterns (e.g., {0, 2, 3, 1} or {0, 3, 0, 3}) may be applied to all TBs to be transmitted within a CG period. The same or different RV patterns may be applied to the TB s to be transmitted within the same CG period.

Figure 7:
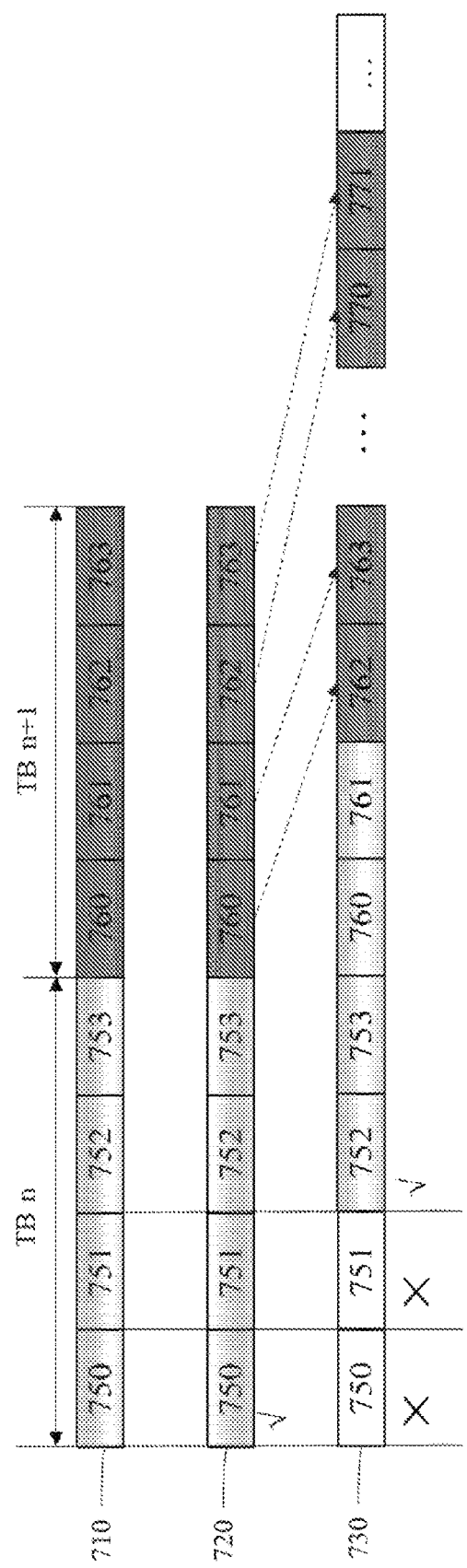
FIG. 7 illustrates an example of an uplink transmission of repetitions of a transport block according an RV pattern in accordance with some embodiments of the present disclosure.

FIG. 7 illustrates an example of an uplink transmission of repetitions of a transport block according an RV pattern in accordance with the above embodiments of the present disclosure. It should be understood that the configurations mentioned in the following text are only for illustrative purposes, and should not be construed as limiting the embodiments of the present disclosure. Also, details described in all of the foregoing embodiments of the present disclosure are applicable for the embodiments shown in FIG. 7.

Assuming that 8 consecutive CG-PUSCHs are configured by a given CG configuration and repK is configured as 4, two TBs (e.g., TB n and TB n+1 as shown in FIG. 7) may be prepared to be transmitted on the 8 CG resources/occasions within one CG period. A UE may select an RV pattern (e.g., {0, 2, 3, 1}) from a set of old RV patterns for both TB n and TB n+1.

According to the selected RV pattern, the UE may then prepare four repetitions (e.g., RV0, RV2, RV3, and RV1) of TB n corresponding to the first 4 consecutive candidate CG occasions and 4 repetitions (e.g., RV0, RV2, RV3, and RV1) of TB n+1 corresponding to the last 4 consecutive candidate CG occasions. Referring to FIG. 7, line 710 shows four CG-PUSCHs (e.g., CG-PUSCHs 750-753) for transmitting repetitions (e.g., RV0, RV2, RV3, and RV1) of TB n and four CG-PUSCHs (e.g., CG-PUSCHs 760-763) for transmitting repetitions (e.g., RV0, RV2, RV3, and RV1) of TB n+1. That is, CG-PUSCHs 750-753 may carry RV1, RV3, RV2, and RV0 of TB n, respectively; and CG-PUSCHs 760-763 may carry RV1, RV3, RV2, and RV0 of TB n+1, respectively.

In some embodiments of the present disclosure, preparing repetitions for TB n+1 may be simultaneously done while performing channel access procedure(s) for TB n or transmitting the repetitions of TB n.

The UE may perform a channel access procedure (e.g., an LBT procedure) at the first candidate CG occasion (e.g., CG-PUSCH 750). When the LBT procedure for the first CG-PUSCH carrying the first repetition (e.g., RV0) of TB n is successful, then all the eight CG-PUSCHs prepared for the eight CG resources are transmitted together without performing any LBT procedures for the other seven CG-PUSCHs. For example, referring to FIG. 7, as shown at line 720, when an LBT procedure for CG-PUSCH 750 carrying RV0 of TB n is successful, CG-PUSCHs 750-753 respectively carrying RV0, RV2, RV3, and RV1 of TB n, and CG-PUSCHs 760-763 respectively carrying RV0, RV2, RV3, and RV1 of TB n+1 are transmitted one by one, without performing any LBT procedure for the other seven CG-PUSCHs.

In some embodiments of the present disclosure, the LBT procedure may fail. For example, as shown in FIG. 7, at line 730, the LBT procedures for the first two CG-PUSCH transmission occasions (e.g., CG-PUSCHs 750 and 751 carrying RV0 and RV2 of TB n) may fail. However, the LBT procedure for the third CG-PUSCH transmission occasion (e.g., CG-PUSCH 752 carrying RV3 of TB n) may succeed. In this scenario, the UE may transmit RV3 of TB n on CG-PUSCH 752, and simultaneously generate a new CG-PUSCH carrying RV0 of TB n. The UE may transmit RV0 of TB n on CG-PUSCH 753 and simultaneously generate a new CG-PUSCH carrying one (e.g., RV2) of the remaining RVs of TB n according to the selected RV pattern. The UE may transmit RV2 of TB n on CG-PUSCH 760 and simultaneously generate a new CG-PUSCH carrying the last remaining RV (e.g., RV1) of TB n. The UE may transmit RV1 of TB n on CG-PUSCH 761 and simultaneously generate a new CG-PUSCH carrying the first repetition (e.g., RV0) of TB n+1 according to the selected RV pattern. In this manner, the UE may transmit RV0 and RV2 of TB n+1 on CG-PUSCHs 762 and 763 as denoted in dotted arrow in FIG. 7. The last two repetitions (e.g., RV3 and RV1) of TB n+1 are suspended and kept in the buffer of the UE.

The UE may determine whether an ACK corresponding to TB n+1 is received or not. If the case that an ACK corresponding to TB n+1 is received before the start of the next CG period, the UE will flush out RV3 and RV1 of TB n+1 from its buffer. If the case that an NACK corresponding to TB n+1 is received or no HARQ-ACK feedback is received for TB n+1 before the start of the next CG period, the UE may try to transmit RV3 and RV1 of TB n+1 on the first two CG occasions of the next CG period. For example, as denoted in dotted arrow in FIG. 7, the UE may transmit RV3 and RV1 of TB n+1 on CG-PUSCHs 770 and 771, respectively.

Although the same old RV pattern is applied to TB n and TB n+1 in the above example, it should be appreciated by persons skilled in the art that different old RV patterns may be applied to TB n and TB n+1, respectively.

Figure 8:
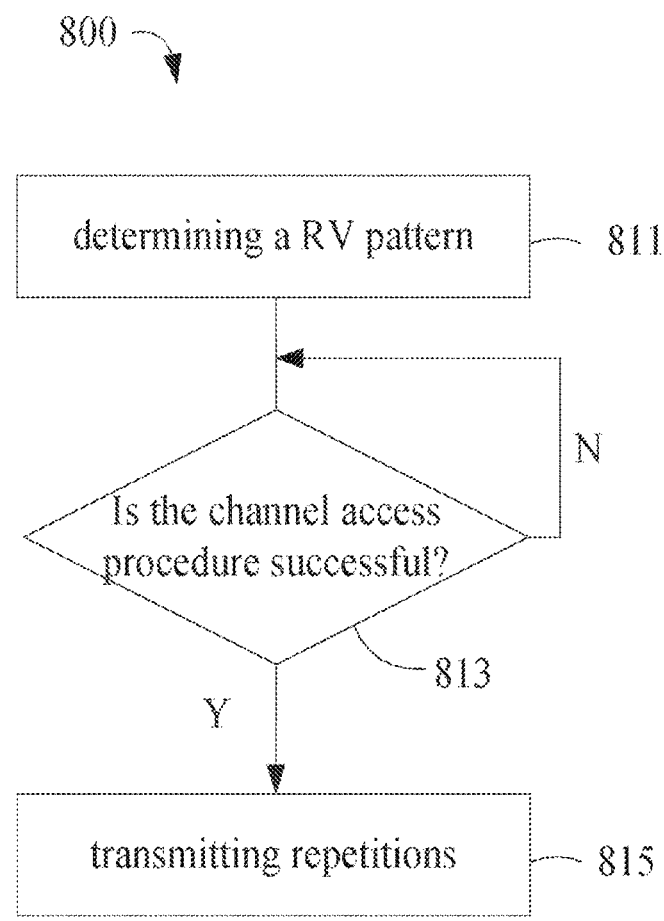
FIG. 8 illustrates a flow chart of an exemplary procedure of wireless communications in accordance with some embodiments of the present disclosure.

FIG. 8 illustrates a flow chart of an exemplary procedure 800 for transmitting transport blocks in accordance with some embodiments of the present disclosure. Details described in all of the foregoing embodiments of the present disclosure are applicable for the embodiments shown in FIG. 8. The procedure may be performed by a UE, for example, UE 110a or UE 110b in FIG. 1.

Referring to FIG. 8, in operation 811, a UE may determine an RV pattern. For example, the UE may select an RV pattern from a set of RV patterns for transmitting a number of repetitions (e.g., repK) of a TB (e.g., TB n) in a certain CG period. In some examples, the set of RV patterns may be predefined at a UE (e.g., predefined in standard). In some other examples, the UE may receive a signaling message for configuring the set of RV patterns.

The UE may then generate repetitions of TB n according to the determined RV pattern, and prepare corresponding CG-PUSCHs carrying the repetitions of the TB n. The UE may perform a channel access procedure for the first repetition of TB n according to the determined RV pattern. In operation 813, the UE may determine whether the channel access procedure is successful or not. When it is determined that the channel access procedure for the first repetition of TB n is successful, the UE may transmit the number of repetitions of TB n according to the RV pattern in operation 815.

When it is determined that the channel access procedure for the first repetition of TB n is not successful, the UE may handle TB transmissions according to one of the methods described above with respect to FIGS. 2-7.

In some embodiments of the present disclosure, the UE may handle TB transmissions according to the method described above with respect to FIG. 3. For example, when it is determined that the channel access procedure for the first repetition of TB n is not successful, the UE may clear the first repetition of TB n, and may perform a channel access procedure for a second repetition of TB n according to the determined RV pattern. In response to the channel access procedure for the second repetition of TB n being successful, the UE may transmit the second repetition of TB n and subsequent repetitions of TB n according to the determined RV pattern. In response to the channel access procedures for all the number of repetitions of TB n being failed, the UE may postpone the transmission of the number of repetitions of TB n to a next CG period. In some embodiments of the present disclosure, the RV pattern for TB n is a new RV pattern.

In some embodiments of the present disclosure, when it is determined that the channel access procedure for the first repetition of TB n is not successful, the UE may keep the first repetition of TB n. The UE may perform a channel access procedure for a second repetition of TB n according to the determined RV pattern.

In some examples, the UE may handle TB transmissions according to the method described above with respect to FIG. 4. For example, in response to the channel access procedure for the second repetition of TB n being successful, the UE may transmit the second repetition of TB n and subsequent repetitions of TB n according to the determined RV pattern. The UE may postpone the transmission of the first repetition of TB n to a next CG period in the case that an ACK corresponding to TB n is not received before the next CG period.

In some examples, the UE may handle TB transmissions according to the method described above with respect to FIG. 5. For example, in response to the channel access procedure for the second repetition of TB n being successful, the UE may transmit the second repetition of TB n and subsequent repetitions of TB n according to the determined RV pattern.

Assuming that more than one TB (e.g., TB n and TB n+1) is transmitted in a CG period, the UE may further select another RV pattern from the set of RV patterns for transmitting the number of repetitions (e.g., repK) of another TB (e.g., TB n+1) in the CG period. As described above, the RV patterns for TB n and TB n+1 may be the same or different. The UE may transmit the first repetition of TB n on a resource for a first repetition of TB n+1. The UE may postpone the transmission of the first repetition of TB n+1 to a next CG period in the case that an ACK corresponding to TB n+1 is not received before the next CG period.

In some examples, the UE may handle TB transmissions according to the method described above with respect to FIG. 6. For example, in response to the channel access procedure for the second repetition of TB n being successful, the UE may transmit the second repetition of TB n and subsequent repetitions of TB n according to the determined RV pattern.

Assuming that more than one TB (e.g., TB n and TB n+1) is transmitted in a CG period, the UE may further select another RV pattern from the set of RV patterns for transmitting the number of repetitions (e.g., repK) of another TB (e.g., TB n+1) in the CG period. As described above, the RV patterns for TB n and TB n+1 may be the same or different. The UE may transmit the first repetition of TB n on a resource for a first repetition of TB n+1. The UE may further shift the transmission of the number of repetitions of TB n+1 according to the another RV pattern to the end of the transmission of the number of repetitions of TB n. The UE may postpone the transmission of a last repetition of the number of repetitions of TB n+1 to a next CG period in the case that an ACK corresponding to TB n+1 is not received before the next CG period.

In some embodiments of the present disclosure, the RV pattern for TB n is a new RV pattern, and the RV pattern for TB n+1 is a new or old RV pattern. In some embodiments of the present disclosure, the RV patterns for TB n and TB n+1 are old RV patterns.

In some examples, the UE may handle TB transmissions according to the method described above with respect to FIG. 7. For example, in response to the channel access procedure for the second repetition of TB n being successful, the UE may transmit the second repetition of TB n. The UE may generate a repetition of TB n having an RV with the most systematic bits (e.g., RV0) while transmitting the second repetition of TB n. The UE may transmit RV0 and the repetitions of TB n with the remaining RVs according to the determined RV pattern.

Assuming that more than one TB (e.g., TB n and TB n+1) is transmitted in a CG period, the UE may further select another RV pattern from the set of RV patterns for transmitting the number of repetitions (e.g., repK) of another TB (e.g., TB n+1) in the CG period. As described above, the RV patterns for TB n and TB n+1 may be the same or different. The UE may shift the transmission of the number of repetitions of TB n+1 according to the another RV pattern to the end of the transmission of the number of repetitions of TB n. The UE may postpone the transmission of the last repetition of the number of repetitions of TB n+1 to a next CG period in the case that an ACK corresponding to TB n+1 is not received before the next CG period.

In some embodiments of the present disclosure, the RV patterns for TB n and TB n+1 are old RV patterns.

It should be appreciated by persons skilled in the art that the sequence of the operations in exemplary procedure 800 may be changed and some of the operations in exemplary procedure 800 may be eliminated or modified, without departing from the spirit and scope of the disclosure.

Figure 9:
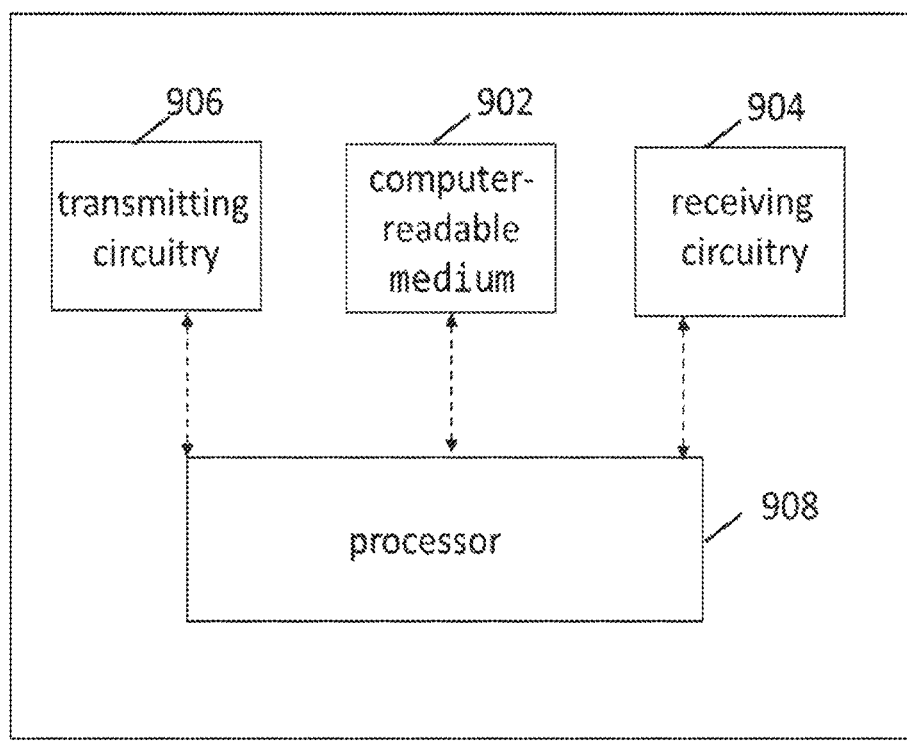
FIG. 9 illustrates a block diagram of an exemplary apparatus in accordance with some embodiments of the present disclosure.

FIG. 9 illustrates an example block diagram of an apparatus 900 according to some embodiments of the present disclosure. The apparatus 900 may be a BS or a UE.

Referring to FIG. 9, the apparatus 900 may include at least one non-transitory computer-readable medium 902, at least one receiving circuitry 904, at least one transmitting circuitry 906, and at least one processor 908. In some embodiments of the present application, at least one receiving circuitry 904 and at least one transmitting circuitry 906 can be integrated into at least one transceiver. The at least one processor 908 may be coupled to the at least one non-transitory computer-readable medium 902, the at least one receiving circuitry 904 and the at least one transmitting circuitry 906. In some embodiments of the present disclosure, the apparatus 900 may further include an input device, a memory, and/or other components.

In some embodiments of the present disclosure, the at least one non-transitory computer-readable medium 902 may have stored thereon computer-executable instructions to cause the at least one processor 908 to implement the operations, steps, or methods with respect to the UEs as described above. For example, the computer-executable instructions, when executed, cause the at least one processor 908 interacting with the at least one receiving circuitry 904 and the at least one transmitting circuitry 906, so as to perform the steps with respect to the UEs depicted in FIGS. 1-8. In some examples, the at least one receiving circuitry 904 may receive configuration information related to a configured grant. The at least one receiving circuitry 904 may receive configuration information related to RV patterns. The at least one processor 908 may determine an RV pattern applied to repetitions of a TB. The at least one transmitting circuitry 906 may transmit repetitions of a TB according to the RV pattern.

In some embodiments of the present disclosure, the at least one non-transitory computer-readable medium 902 may have stored thereon computer-executable instructions to cause the at least one processor 908 to implement the operations, steps, or methods with respect to the BSs as described above. For example, the computer-executable instructions, when executed, cause the at least one processor 908 interacting with the at least one receiving circuitry 904 and the at least one transmitting circuitry 906, so as to perform the steps with respect to the BSs depicted in FIGS. 1-8. For example, the at least one transmitting circuitry 906 may transmit configuration information to a UE via RRC signaling. The at least one receiving circuitry 904 may receive UCI and uplink TBs. The at least one processor 908 may determine the RV pattern applied to the TBs according to the UCI.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. A method performed by a user equipment (UE), comprising:
   determining a first redundancy version (RV) pattern from a set of RV patterns for transmitting repetitions of a first transport block (TB) in a first configured grant (CG) period;
   performing a channel access procedure for a first repetition of the first TB according to the first RV pattern for transmitting the repetitions of the first TB; and
   transmitting, during the first CG period and in response to the channel access procedure for the first repetition of the first TB being successful, at least the first repetition and a second repetition of the first TB according to the first RV pattern.

2. The method of claim 1, further comprising in response to the channel access procedure for a third repetition of the first TB being failed:
   clearing the third repetition of the first TB, wherein the channel access procedure for the third repetition is performed prior to performing the channel access procedure for the first repetition of the first TB according to the first RV pattern.

3. The method of claim 1, further comprising in response to the channel access procedure for a third repetition of the first TB being failed:
   keeping the third repetition of the first TB, wherein the channel access procedure for the third repetition is performed prior to performing the channel access procedure for the first repetition of the first TB according to the first RV pattern.

4. The method of claim 1, further comprising:
   receiving a signaling message for configuring the set of RV patterns.

5. A user equipment (UE) for wireless communication, comprising:
   at least one memory; and
   at least one processor coupled with the at least one memory and operable to cause the UE to:

determine a first redundancy version (RV) pattern from a set of RV patterns for transmitting repetitions of a first transport block (TB) in a first configured grant (CG) period;
perform a channel access procedure for a first repetition of the first TB according to the first RV pattern for transmitting the repetitions of the first TB; and
transmit, during the first CG period and in response to the channel access procedure for the first repetition of the first TB being successful, at least the first repetition and a second repetition of the first TB according to the first RV pattern.

6. The UE of claim 5, wherein the at least one processor is further operable to cause the UE to, in response to the channel access procedure for a third repetition of the first TB being failed:
clear the third repetition of the first TB, wherein the channel access procedure for the third repetition is performed prior to performing the channel access procedure for the first repetition of the first TB according to the first RV pattern.

7. The UE of claim 6, wherein the at least one processor is further operable to cause the UE to:
transmit multiple subsequent repetitions of the first TB according to the first RV pattern in response to the channel access procedure for the first repetition of the first TB being successful.

8. The UE of claim 6, wherein according to the first RV pattern, a last repetition of the first TB has an RV with most systematic bits.

9. The UE of claim 5, wherein the at least one processor is further operable to cause the UE to, in response to the channel access procedure for a third repetition of the first TB being failed:
keep the third repetition of the first TB, wherein the channel access procedure for the third repetition is performed prior to performing the channel access procedure for the first repetition of the first TB according to the first RV pattern.

10. The UE of claim 9, wherein the at least one processor is further operable to cause the UE to, in response to the channel access procedure for the first repetition of the first TB being successful:
transmit multiple subsequent repetitions of the first TB according to the first RV pattern; and
postpone transmission of the third repetition of the first TB to a next CG period in a case that an acknowledgement corresponding to the third TB is not received before the next CG period.

11. The UE of claim 9, wherein the at least one processor is further operable to cause the UE to:
determine a second RV pattern from the set of RV patterns for transmitting repetitions of a second TB in the first CG period.

12. The UE of claim 11, wherein the at least one processor is further operable to cause the UE to, in response to the channel access procedure for the first repetition of the first TB being successful:
transmit multiple subsequent repetitions of the first TB according to the first RV pattern:
transmit the third repetition of the first TB on a resource for a first repetition of the second TB; and
postpone transmission of the first repetition of the second TB to a next CG period in a case that an acknowledgement corresponding to the second TB is not received before the next CG period.

13. The UE of claim 11, wherein the at least one processor is further operable to cause the UE to, in response to the channel access procedure for the first repetition of the first TB being successful:
transmit multiple subsequent repetitions of the first TB according to the first RV pattern;
transmit the third repetition of the first TB on a resource for a first repetition of the second TB;
shift transmission of the repetitions of the second TB according to the second RV pattern to an end of transmission of the repetitions of the first TB; and
postpone transmission of a last repetition of the repetitions of the second TB to a next CG period in a case that an acknowledgement corresponding to the second TB is not received before the next CG period.

14. The UE of claim 11, wherein the at least one processor is further operable to cause the UE to, in response to the channel access procedure for the first repetition of the first TB being successful:
generate a repetition of the first TB having an RV with a most systematic bits while transmit the first repetition of the first TB;
transmit the repetition of the first TB having the RV with the most systematic bits; and
transmit the repetitions of the first TB with remaining RVs according to the first RV pattern.

15. The UE of claim 14, wherein the at least one processor is further operable to cause the UE to:
shift transmission of the repetitions of the second TB according to the second RV pattern to an end of transmission of the repetitions of the first TB; and
postpone transmission of a last repetition of the repetitions of the second TB to a next CG period in a case that an acknowledgement corresponding to the second TB is not received before the next CG period.

16. The UE of claim 11, wherein the second RV pattern is a same pattern as the first RV pattern.

17. The UE of claim 11, wherein the second RV pattern is different from the first RV pattern.

18. The UE of claim 6, wherein the at least one processor is further operable to cause the UE to:
receive a signaling message for configuring the set of RV patterns.

19. The UE of claim 6, wherein the set of RV patterns is predefined.

20. A processor for wireless communication, comprising:
at least one controller coupled with at least one memory and configured to cause the processor to:
determine a first redundancy version (RV) pattern from a set of RV patterns for transmitting repetitions of a first transport block (TB) in a first configured grant (CG) period;
perform a channel access procedure for a first repetition of the first TB according to the first RV pattern for transmitting the repetitions of the first TB; and
transmit, during the first CG period and in response to the channel access procedure for the first repetition of the first TB being successful, at least the first repetition and a second repetition of the first TB according to the first RV pattern.

\* \* \* \* \*